United States Patent

Dills

[15] 3,673,704
[45] July 4, 1972

[54] TEACHING DEVICE

[72] Inventor: Marguerite B. Dills, 770 West Twenty-sixth Street #B, San Pedro, Calif. 90731

[22] Filed: Dec. 5, 1969

[21] Appl. No.: 882,536

[52] U.S. Cl. .................................................................35/8
[51] Int. Cl. ............................................................G09b 1/24
[58] Field of Search ........................35/8, 9, 31 R, 31 A, 31 B, 35/31 C, 31 G, 35 R, 35 D, 35 E, 35 G, 35 J, 69–72, 76, 77; 40/68, 77.8, 77.9

[56] References Cited

UNITED STATES PATENTS

| | | | |
|---|---|---|---|
| 2,092,577 | 9/1937 | Hornung | 35/9 R |
| 2,632,962 | 3/1953 | Jacobson et al. | 35/35 R UX |
| 2,921,387 | 1/1960 | Reeves | 35/76 X |

FOREIGN PATENTS OR APPLICATIONS

| | | | |
|---|---|---|---|
| 582,882 | 10/1924 | France | 40/68 |
| 169,289 | 10/1951 | Austria | 35/9 R |

Primary Examiner—Wm. H. Grieb
Attorney—Don B. Finkelstein

[57] ABSTRACT

There is disclosed herein an improved teaching arrangement in which there is provided a thin strip-like body member that is foldable into a polygon such as a hexagon and has material printed on the external faces thereof and on the internal faces thereof. The polygon is a thin rim-like polygon and hence, the internal faces are also visible. There is information printed on the external faces and corresponding pertinent information is printed on the internal faces and the body member is enclosed in a holder means that maintains the body member in the polygon configuration.

8 Claims, 7 Drawing Figures

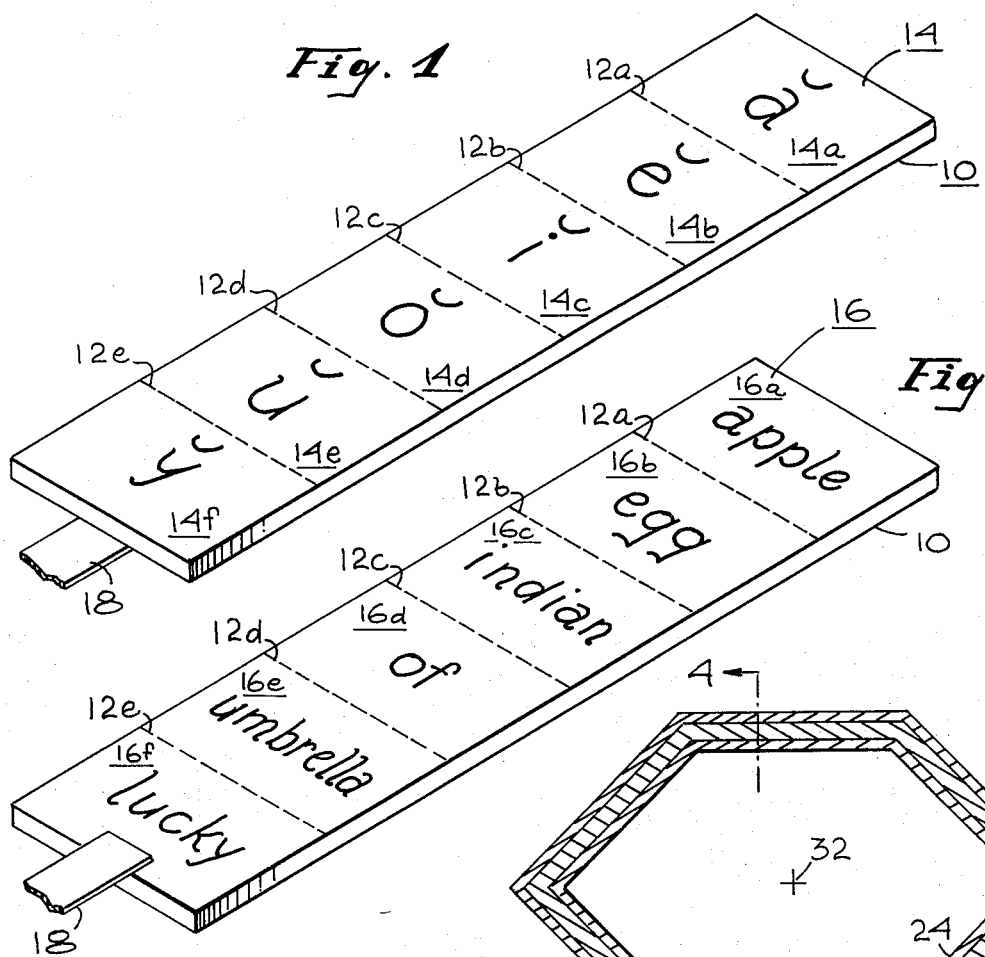

TEACHING DEVICE

BACKGROUND OF THE INVENTION

1. Field of the Invention

This invention relates to the educational art and more particularly to an improved invention to aid in the teaching of various subjects.

2. Description of the Prior Art

In many applications, such as language teaching, arithmetic teaching and the like it is often desirable to provide a language teaching procedure in which the maximum number of human senses are involved during the learning process. This is particularly true when the teaching of young children is involved since it has been shown in many instances that the more senses that are involved the greater is the amount of knowledge that is retained by the student. Further, young children are known to have a normal proclivity for manual manipulation of various objects during learning that is a natural part of their inherent characteristics. Often such manual manipulation has been decried by teachers and others as distracting "fiddling" or as, in fact, it is often an unconscious set of muscular movements on the part of the child. However, applicant has found, that such natural desires, whether conscious or subconscious of children, to manipulate objects is not only a necessary part of their growth and knowledge patterns as well as learning instincts but also can be combined with a purposeful learning program in which the manipulation of an object forms an integral part of the learning process.

SUMMARY OF THE INVENTION

Accordingly, it is the object of applicant's invention herein to provide an improved teaching arrangement.

As another object of applicant's invention to provide a teaching arrangement in which a structural device that may be manipulated by the student during the learning process can effectively be utilized.

It is yet another object of applicant's invention herein to provide a teaching arrangement manipulatable by the students and useful for providing an increased learning rate.

It is yet another object of applicant's invention herein to provide a teaching arrangement that is comparatively inexpensive to fabricate and comparatively long lasting in utilization.

The above and other objects are achieved, according to one aspect of applicant's invention, by providing a thin strip-like body member, for example a thin strip of paper, that is foldable into a preselected polygon shape along preselected score lines. That is, the polygon may be folded to form, for example, a hexagon in a thin rim-like shape and the hexagon has external faces upon which preselected information is imprintable and corresponding internal faces in which information pertinent to the information on a particular outside face is selectively imprintable. The open polygon configuration allows viewing of both the external faces and the internal faces by not only the student but also by the teacher. Further, the polygon adapts itself quite readily to free manipulation by the student.

Applicant has found that while children enjoy the manipulation of the polygon, adults in learning, for example, second or third languages, gained almost as much as an increase in their learning rate by being able to manipulate the polygon during the learning process as do children. Therefore, it is applicant's belief, that the manipulation of the polygon while reading and sounding the information imprinted on either the external or internal faces of the polygon provides an increased learning rate as well as making the fundamental task of learning easier.

Applicant has selected for utilization as an example herein the adaptation of applicant's invention to a language teaching device. It will be appreciated, of course, that applicant's invention is not so limited to merely teaching languages but can be equally well utilized to teaching arithmetic to young children, teaching scientific principals together with their explanations or the like. The particular information that may be imprinted on any of the faces is immaterial to the practice of applicant's invention. Rather, it is the particular design of the structural unit embodying the printed information that provides the manipulative polygon useful in the practice of applicant's invention herein.

BRIEF DESCRIPTION OF THE DRAWINGS

FIGS. 1 and 2 illustrate one embodiment of applicant's invention herein;

FIGS. 3 and 4 illustrate another embodiment of applicant's invention herein.

FIG. 5 illustrates another embodiment of applicant's invention herein.

FIG. 6 illustrates another embodiment of applicant's invention herein; and

FIG. 7 illustrates another embodiment of applicant's invention herein.

DESCRIPTION OF THE PREFERRED EMBODIMENTS

Before detailing the description of the embodiments of applicant's invention shown on the above described figures, applicant wishes to point out that applicant has utilized the teaching of languages as a sample of the type of information that may be presented in applicant's teaching arrangement. Further, applicant has utilized the teaching of the English language for illustrative purposes only. Therefore, applicant's invention is not to be construed as limited to teaching of languages but rather this has been selected as an illustrative example of one discipline that may be conveniently taught utilizing applicant's improved teaching arrangement.

Further, applicant has directed the description of the utilization of applicant's invention to the teaching of the English language to children. However, it will be apparent to those skilled in the art, that the basic principals underlying applicant's teaching arrangement comprising incorporation of other information imprinted thereon may equally well be utilized in many other disciplines in many other fields.

Educators generally recognize that children, looking at the letters of the alphabet, are not naturally appreciative of the use either in word construction, their sounds or the sequence in which they may be used in the building of words. Further, many children even have difficulty in appreciating the direction in which languages are generally read which, for English, is of course left to right. Many children in the middle and upper primary grades have little comprehension of word construction except if they learned by root and by memory. Generally they have learned that certain letters of the alphabet are called vowels and others consonants, and that when the two vowels are used together they affect one another, and that certain letter combinations have different sounds, but they have no physical key that they can recall to set them straight if their memory fails them.

It has been found that in teaching small children and working in the art of phonics, when a young child can have certain phonic elements grouped or related with each other in some form that the child can handle, see and "sound out", these will aid his memory in originally learning word construction and later in remembering the reason and underlying principals why words are built up of certain given letters of the alphabet. Further, the teacher can aid by having the instructional information in a convenient form pertinent to the particular information that is being presented to the student in the same type of teaching arrangement. It will be appreciated that when the student is of a more advanced age and able to comprehend the instructional information such information may equally well be included for the use of the student as well as the teacher while learning the particular information that is being taught.

However, by presenting the information that may be utilized in a manipulative structure such that games or speed of recognition can be injected into the learning process the urge to win or excel at a game will often cause such children to concentrate on the recognition of the information that is presented and the relationship of that information to other bits of information that may be presented in similar structural form.

I have found, however, that the manipulative technique is preferably in a single plane. That is, the structure that is to be manipulated should only be manipulated during the learning process in a single plane such as that traversed by the rim of a wheel as it is rotated on an axle. The utilization of cubes or other multiplane manipulative devices often confuses small children, as well as many adults, and can lead to the incorporation of excess time and energy being directed towards the correct manipulative procedure rather than the learning procedure.

Thus, by imprinting certain information on the external faces of an open thin rim-like polygon and corresponding information on the inside faces thereof, applicant has been able to provide the devices, which applicant prefers to call PHONA-WHEELS, that are manipulated only in one plane by rotating about an imaginary axis falling through the open cavity defined by the polygon so that appropriate information may be learned.

Referring now to FIGS. 1 and 2 there is shown a strip-like body member generally designated 10 that is at least partially foldable along the preselected scorelines 12a, 12b, 12c, 12d and 12e so that, when folded therealong will define a regular polygon which, in this embodiment of applicant's invention, is a hexagon since six separate faces 14a, 14b, 14c, 14d, 14e and 14f are provided on the external surface 14 thereof and when so folded along the scorelines 12a, 12b, 12c, 12d and 12e there is also provided a plurality of corresponding internal faces 16a, 16b, 16c, 16d, 16e and 16f of the internal surface 16 of the strip-like body member 10. The strip-like body member 10 may be fabricated, for example, of paper, thin cardboard, thin metal, or any other material suitable for the purpose provided that the external face 14 and the internal face 16 are at least capable of having preselected informational material imprinted thereon. For convenience in description, applicant shows the body member 10 as imprinted with the six vowel sounds a, e, i, o, u and y, and consequently, one each of these vowels and one each of the sounds associated with each of these vowels are imprinted on each of the external faces 14a, 14b, 14c, 14d, 14e and 14f. Thus, the short a sound is imprinted on external face 14a, the short e sound is imprinted on external face 14b, the short i sound is imprinted on external face 14c, the short o sound is imprinted on external face 14d, the short u sound is imprinted on external face 14e and the short y sound is imprinted on external face 14f.

There is corresponding information imprinted on the internal faces 16 of the body member 10. That is, there is preselected information imprinted on each of the internal faces 16a, 16b, 16c, 16d, 16e and 16f corresponding to the preselected information imprinted on the external faces 14 of the body member 10. For example, the internal face 16a has the word apple with the letter a underlined to correspond to the indicated short a sound shown on external face 14a. Similarly, internal face 16b has the word egg with the letter e underlined corresponding to the short e sound shown on external face 14b. Similar words with the appropriate letter underlined are included on the remainder of the internal faces. It will be appreciated, of course, that the particular information imprinted on the external faces and the internal faces of applicant's teaching arrangement defined herein is immaterial to the particular practice of applicant's invention and may be varied as needed to suit the particular teaching requirements.

Means are provided to hold the body member 10 together in the form of a regular hexagon when it has been folded along the scorelines 12a, 12b, 12c, 12d, and 12e. As shown in FIGS. 1 and 2 a holder means such as a piece of tape 18 may be included to retain the hexagon shape by adhering to the internal face 16f and the internal face 16a when the unit has been folded into the regular hexagon. When the unit is so folded it may be held up to view so that the external faces 14 appear and the information corresponding thereto appear on the reverse side or on the internal faces 16 for applicable use.

Since the vowel sounds are six in number they thus fit conveniently on the six sides of the regular hexagon and when the regular hexagon is rotated about an axis through the center thereof it can be seen that rotation in this single plane sequentially brings to view each of the external and internal faces.

Applicant has discovered that most children can recognize vowels by their long sounds or real names, but, for example, have difficulty in translating the long sounds or letter names to the short sounds such as those indicated as imprinted on the body member 10 in FIGS. 1 and 2. Thus, the utilization of the interior faces 16 together with the exterior faces 14 present the corresponding information on sound and recognizing the sound in a word increases the recognition and learning power of the student while the body member can be manipulated. It has been seen to be common for a six grade or even a seventh grade student to read a word twice, pronouncing it differently each time. For example, the i and the e sounds are most commonly confused. If this preliminary training provided by applicant's improved teaching arrangement precedes his consideration of an extensive word vocabulary, it will produce better understanding and increase reading skill and will eliminate the process of trial and error in later years. It is generally accepted practice that the vowel sounds be illustrated by short words which correctly illustrate or portray the sound of the vowels, particularly the short sounds thereof. A child can appreciate at some point during the learning process, that the letter y may be both a consonant and a vowel. When it sounds like the letter i, for example, either long or short, it is considered a vowel and I have found that it helps to teach the short sounds or vowels as shown on FIG. 1 imprinted on the external faces 14 of the body member 10 with the corresponding short words printed on the internal faces 16.

It will be appreciated that, depending upon the information imprinted on the external faces 14, various combinations of different PHONA-WHEELS may be manipulated together by the student in order to form, in this example, English words by appropriate grouping of vowels and consonants as may be imprinted on each different PHONA-WHEEL.

Similarly, for arithmetic the information imprinted on the external surface may be the numbers themselves and the corresponding pertinent information imprinted on the inside may be, for example, the names of the cardinal, ordinal, or symbolic, binary or other desired information pertinent to the number on the external surface. Similarly there may be imprinted mathematical or Boolean algebraic directional signs for indicating the appropriate combinations. The utilization of applicant's invention is thus seen to be virtually limitless depending upon the particular course it is desired to teach.

While the holder means 18 that is attached to the body member 10 for holding the body member 10 when it is folded into the regular hexagon may be desirable for some applications, in many instances applicant has found that a more permanent holder means is desired. FIGS. 3 and 4 illustrate one form of a holder means, generally designated 20, that may be utilized in the practice of applicant's invention herein. FIG. 3 is a sectional view taken along the line 3—3 in FIG. 4, and FIG. 4 is a sectional view taken along the line 4—4 of FIG. 3. As shown in FIGS. 3 and 4 the holder means 20 is a generally channel-shaped member having external walls 22 and internal walls 24 defining an interior cavity 25 therebetween in which the body member 10', which may be similar to the body member 10 shown in FIGS. 1 and 2, may be removably positioned. In this embodiment of applicant's invention the external surface 22 and internal surface 24 are joined together by bottom surface 26 leaving the upper portion 28 of the cavity 25 open to allow the removable insertion of the body member 10'. To retain the body member 10' in place during utilization of the teaching arrangement, it may be desirable to include, for example, hook means 30 bridging the open end 28 of the cavity 25 and detachably coupled to the internal wall 24 and external wall 22 of the holder means 20.

When the holder means 20 is rotated about the axis 32 going through the center of the regular hexagon defined thereby, it can be seen that sequentially each external face of the body member 10' may be brought into the line of view, which is schematically illustrated by the arrow 34. Similarly, each internal face is also sequentially brought into line of view indicated by the arrow 34 during such rotation. Thus each internal face and each external face may be viewed either along the line of view 34 or otherwise during the learning process utilizing applicant's improved teaching arrangement.

FIG. 5 illustrates another embodiment of applicant's invention in which a holder means generally designated 40 is provided to encapsulate a body member 10" which, for example, may be similar to the body member 10 shown in FIGS. 1 and 2. In this embodiment of applicant's invention the holder means 40 has external walls 42, internal walls 44, a bottom wall 46 and a top wall 48 and the body member 10' is thus permanently embedded in the cavity 50 defined thereby. In both this embodiment shown in FIG. 5 and the embodiment shown in FIGS. 3 and 4, of course, the holder 20 and the holder 40 are fabricated from a transparent material so that the information imprinted on the body member 10' and 10" may be appropriately read therethrough.

In the embodiment of applicant's invention shown in FIG. 6 a body member 10''' is coated with a transparent coating 52 completely surrounding and enclosing the body member 10''' and bonded thereto. Thus the transparent coating may be a sprayed on or applied coating 52 that, preferably, is washable so as to allow removal of any soiled portions on the external surface.

For the embodiments of applicant's invention thus far described, the holder means which, for example, may be the holder 20 shown in FIGS. 3 and 4, the holder 40 shown in FIG. 5 or the holder defined as the coating means 52 shown in FIG. 6, may be either rigid or flexible depending upon the particular utilization factors associated with the application of applicant's teaching arrangement. However, when the holder means is flexible, a means for restraining the holder together with the body member in the hexagon configuration may be desired. FIG. 7 illustrates one such embodiment of a flexible transparent holder member 54 in which there is embodied a body member 10'''' and in which both the holder member 54 and body member 10'''' are flexible. To achieve retention in the desired polygon configuration, an interlock portion 56 may be provided to restrain the holder member 54 and body member 10'''' in the appropriate position.

This concludes the description of applicant's invention of her improved educational arrangement.

What is claimed is new and desired to be secured by Letters Patent of the United States is:

1. A teaching arrangement comprising, in combination:
   a strip-like body member at least partially foldable along preselected score lines therein to define a multisided polygon having a plurality of external faces and a corresponding plurality of internal faces in one-to-one relationship with said external faces and having first preselected information imprintable on each of said external faces and second preselected information corresponding to and pertinent selectively to said first preselected information imprintable on said corresponding internal faces; and
   holder means for maintaining said strip-like body member in said multisided polygon configuration.
2. The arrangement defined in claim 1 wherein:
   said holder means comprises:
   a transparent member having walls defining a four-sided cavity and said body member positioned within said four-sided cavity.
3. The arrangement defined in claim 2 wherein:
   said cavity is enclosed on all four sides and said strip-like body member is permanently enclosed in said four-sided cavity.
4. The arrangement defined in claim 2 wherein:
   said four-sided cavity is closed on three sides and said strip-like body member is removably positioned within said cavity through said fourth side.
5. The arrangement defined in claim 4 wherein:
   said four-sided cavity is detachably sealable in at least preselected portions of said fourth side thereof.
6. The arrangement defined in claim 2 wherein:
   said holder means comprises:
   a transparent washable coating bonded to said external face and said internal face of said strip-like body member.
7. The arrangement defined in claim 2 wherein:
   said holder means is detachably formable into said multisided polygon.
8. The arrangement defined in claim 2 wherein:
   said multisided polygon comprises a polygon having six sides.

* * * * *